United States Patent

Goldberg

[11] Patent Number: 6,097,439
[45] Date of Patent: Aug. 1, 2000

[54] OMNIBUS CLOSED CAPTIONING DECODER FOR ENCODED VIDEO

[75] Inventor: Adam M. Goldberg, San Jose, Calif.

[73] Assignee: C-Cube Microsystems, Inc., Milpitas, Calif.

[21] Appl. No.: 09/166,012

[22] Filed: Oct. 2, 1998

[51] Int. Cl.[7] .................................................. H04N 7/08
[52] U.S. Cl. .......................................................... 348/465
[58] Field of Search .................................... 348/465, 461, 348/468, 478, 476, 845.2, 553, 564, 563

[56] References Cited

U.S. PATENT DOCUMENTS

| | | | |
|---|---|---|---|
| 5,574,505 | 11/1996 | Lyons et al. | 348/465 |
| 5,699,124 | 12/1997 | Nuber et al. | 348/465 |
| 5,745,184 | 4/1998 | Neal | 348/465 |
| 5,883,675 | 3/1999 | Herz et al. | 348/465 |

*Primary Examiner*—Victor R. Kostak
*Attorney, Agent, or Firm*—Proskauer Rose LLP

[57] ABSTRACT

A method is provided for parsing closed captioning data (or other types of like embedded data, such as extended service data) encoded according to one of at least three syntaxes. An encoded video signal is received which is hierarchically organized into picture sections of a picture layer. Each picture section contains an encoded picture and at least one corresponding user data section. A beginning of a sequence of bits of the user data section is identified within one of the picture sections. If the identified sequence of bits contains either undefined data or closed captioning data encoded according to either a specific first syntax or closed captioning data encoded according to a specific second syntax, but not closed captioning data encoded according to any other syntax, then the following steps are performed. A byte is extracted from a beginning of the sequence representing a user data length. A byte is also extracted following the user data length byte in the sequence, which represents a user data type. A determination is made whether or not the user data length byte equals a first predefined constant or a second predefined constant, indicating the presence of two closed captioning bytes according to the first and second syntaxes, respectively. If so, then a determination is made as to whether or not the user data type byte equals a third predefined constant. If both these determinations are made in the affirmative, then immediately following the user data type byte in the sequence, two closed captioning bytes are extracted for the corresponding picture. An apparatus for performing the method is also disclosed.

15 Claims, 3 Drawing Sheets

OMNIBUS CLOSED CAPTIONING DECODER FOR ENCODED VIDEO

FIELD OF THE INVENTION

The present application pertains to decoding closed captioned text in an encoded video signal, such as an MPEG-2 encoded video signal.

BACKGROUND OF THE INVENTION

Closed captioning is an auxiliary data signal that is transmitted with a video signal indicating text that can be displayed on a display monitor. Closed captioning is most frequently used to provide a textual description of audible sounds (most notably, a transcript of spoken words) supplied with the video signal to aid hearing impaired viewers of video programs to experience an otherwise imperceptible audio portion of video programs.

Since 1992, all television sets in the United States measuring thirteen inches or more diagonally have been required to decode and to display closed captioning text on the television display screen. Furthermore, all broadcasting television equipment used in all television broadcast applications (i.e., satellite, cable television, and terrestrial broadcast) must carry the closed-captioning text end-to-end (whenever present).

The vertical blanking interval of a broadcast analog video signal can carry up two octets (bytes) of closed captioning or "extended data service ("EDS" or XDS")of data per field. The first field of each frame is used for carrying closed captioning data bytes and the second field of each frame is used for carrying XDS data bytes. (While the invention is illustrated herein for closed-captioning data, it is equally applicable to XDS data.) As such, up 120 bytes of XDS data and closed captioning text may be broadcast each second (for NTSC standard video signals).

MPEG-1 and MPEG-2 are popular standards for encoding digital video signals. See ISO\IEC 13818-1,2,3 Information Technology—Generic Coding of Moving Pictures and Associated Audio: Systems, Video and Audio, Nov. 11, 1994 ("MPEG-2")and ISO\IEC 11172-1,2,3 1993, Information Technology—Coding of Moving Pictures and Associated Audio for Digital Storage Media at up to about 1.5 Mbit/s-Parts 1,2,3: Systems, Video and Audio ("MPEG-1"). The MPEG standards specify syntaxes and semantics for formatting compressed video and audio and for decoding and recovering the video and audio for synchronized presentation. Video encoding includes dividing a picture (field or frame) into macroblocks or 16×16 arrays of luminance data and each chrominance block (or 8×8 array of data) that overlies each 16×16 array of luminance data. Some macroblocks are inter-picture motion compensated. The blocks of the motion compensated macroblocks, and the blocks of the non-motion compensated macroblocks, are then discrete cosine transformed, quantized, zig-zag (or alternate) scanned into a sequence, run-level encoded and then variable length encoded.

The MPEG-1 and MPEG-2 syntaxes specify a hierarchical organization for formatting a compressed video bitstream. Levels or layers in the hierarchy are provided for each of the following: a sequence of pictures, a group of pictures in the sequence, a picture in a group, a slice (or contiguous sequence of macroblocks) in a picture, a macroblock of a slice and a block of a macroblock. A header is provided for the sections of the bitstream corresponding to each of the sequence, group of pictures, and picture layers of the hierarchy. Other preliminary information similar to a header is inserted before the sections of each of the slice (e.g., slice_start_code) and macroblock (e.g., macroblock_address_increment and macroblock_type) layers. Other (optional) sections may be inserted into the sequence sections of the sequence layer (e.g., sequence extension, sequence displayable extension, sequence scalable extension, and user data(0)), the group of pictures sections of the group of pictures layer (e.g., extension data (1) and user data (1)) or the picture sections of the picture layer (e.g., picture coding extension, quant matrix extension, picture displayable extension, picture temporal scalable extension, picture spatial scalable extension, copyright extension, and user data (2)). An example of a picture section includes a picture header, a user data(2) section and compressed data for one picture formatted into multiple slice, macroblock and block sections.

MPEG defines no manner for carrying closed-captioning data. As such, there are at least four different syntaxes for carrying closed captioning data in the user data (2) section of a picture section. One or more of the syntaxes can also be used for formatting XDS data, which is an infrequently used additional pair of bytes carried in the odd field of a frame. These syntaxes are set forth in Tables 1–4 below. Below, nextbits( ) is a function that examines a number of bits in a sequence, "uimsbf" means "unsigned integer, most significant bit first" and "bslbf" means "bit string, leftmost bit first."

TABLE 1

| Field name | Syntax 1 | |
|---|---|---|
| | # of Bits | Mnemonic |
| picture_user_data() { | | |
|   user_data_start_code | 32 | |
|   while (nextbits() != 0x000001) { | | |
|     user_data_length | 8 | uimsbf |
|     user_data_type | 8 | uimsbf |
|     if (user_data_type == 0xff) { | | |
|       next_user_data_type | 8 | uimsbf |
|     } | | |
|     if (user_data_type == 0x09) { | | |
|       cc_data_bytes | 8*2 | uimsbf |
|     } else | | |
|     if (user_data_type == 0x0a) { | | |
|       eds_data_bytes | 8*2 | uimsbf |
|     } else | | |

TABLE 1-continued

```
    if (user_data_type == 0x02 ||
        user_data_type == 0x04)
            reserved                   8*user_data_length-1  uimsbf
        else
            reserved                   8*user_data_length    uimsbf
    }
}
where:
    user_data_start_code    is the start code sequence defined in MPEG indicating that a user
                            data section follows.
    user_data_type          is an indication of the type of data stored in the field.
                            User_data_types specified by the constants 0x09 and 0x0a indicate
                            closed captioning data. Other types are defined but are not
                            discussed herein.
    user_data_length        is the number of data bytes following user_data_type before the
                            next user_data_length field, unless user_data_type is the constant
                            0x02 or the constant 0x03, in which case user_data_length is the
                            number of data bytes following user_data_length before the next
                            user_data_length field.
    cc_data_bytes           are two bytes of closed captioning data.
    eds_data_bytes          are two bytes of EDS data which are treated as closed captioning
                            data herein.
```

TABLE 2

Syntax 2

| Field name | # of Bits | Mnemonic |
|---|---|---|
| picture_user_data() { | | |
|   user_data_start_code | 32 | |
|   while (nextbits() != 0x000001) { | | |
|     user_data_length | 8 | uimsbf |
|     user_data_type | 8 | uimsbf |
|     if (user_data_type == 0xff) { | | |
|       next_user_data_type | 8 | uimsbf |
|     } | | |

TABLE 2-continued

| | | |
|---|---|---|
|     if (user_data_type == 0x09) { | | |
|       cc_data_bytes | 8*(user_data_length-1) | uimsbf |
|     } else | | |
|     if (user_data_type == 0x0a) { | | |
|       eds_data_bytes | 8*(user_data_length-1) | uimsbf |
|     } else | | |
|       reserved | 8*(user_data_length-1) | uimsbf |
|   } | | |
| } | | |

TABLE 3

Syntax 3

| Field name | # of Bits | Mnemonic |
|---|---|---|
| user_data() { | | |
|   user_data_start_code | 32 | bslbf |
|   ATSC_identifier = '0x4741 3934' | 32 | bslbf |
|   user_data_type_code | 8 | uimsbf |
|   if (user_data_type_code == 0x03){ | | |
|     process_em_data_flag | 1 | bslbf |
|     process_cc_data_flag | 1 | bslbf |
|     additional_data_flag | 1 | bslbf |
|     cc_count | 5 | uimsbf |
|     em_data | 8 | bslbf |
|     for (i=0; i<cc_count; i++){ | | |
|       marker_bits='11111' | 5 | bslbf |
|       cc_valid | 1 | bslbf |
|       cc_type | 2 | bslbf |
|       cc_data_1 | 8 | bslbf |
|       cc_data_2 | 8 | bslbf |
|     } | | |
|     marker_bits='1111 1111' | 8 | bslbf |
|     if(additional_data_flag){ | | |
|       while {nextbits() != '0000 0000 0000 0000 0001'){ | | |
|         additional_user_data | 8 | |
|       } | | |
|     } | | |
|   } | | |
| } | | |
| where: | | |

TABLE 3-continued

| | |
|---|---|
| ATSC_identifier | is a constant defined to be '0x4741 3934'. |
| user_data_type_code | is defined to be the constant 0x03. |
| process_em_data_flag | is a flag indicating the need to process emergency broadcast message data. |
| process_cc_data_flag | is a flag indicating the need to process closed captioning data. |
| additional_data_flag | is a flag indicating the presence of additional data. |
| cc_count | is a counter indicating the number of pairs of closed captioning bytes present. |
| em_data | is the emergency broadcast data. |
| cc_valid | is a flag indicating that there is valid closed captioning data in this user data section. |
| cc_type | denotes the type of closed captioning data present and follows the convention set forth in EIA, Recommended Practice for Advanced Television Closed Captioning, draft July 1, 1994. '00' denotes closed captioning, '01' denotes XDS, '10' denotes ATVCC Channel Packet Data and '11' denotes ATVCC Channel Packet Start. Note that cc_type's '10' and '11' are defined for HDTV only. However, the invention described herein can nevertheless parse such information. |
| cc_data_1 cc_data_2 | are the closed captioning data bytes for this picture (and, when cc_count>1, the closed captioning data bytes for other omitted, subsequent pictures). |

TABLE 4

Syntax 4

| Field name | # of Bits | Mnemonic |
|---|---|---|
| picture_user_data() { | | |
|   user_data_start_code | 32 | bslbf |
|   user_data_type_code | 8 | uimsbf |
|   if (user_data_type_code == 0x03){ | | |
|     reserved | 7 | bslbf |
|     valid_flag | 1 | bslbf |
|     if(valid_flag == 0x01){ | | |
|       cc_count | 5 | uimsbf |
|       for (i=0; i<cc_count; i++){ | | |
|       reserved | 2 | bslbf |
|       cc_type | 2 | bslbf |
|       reserved | 5 | bslbf |
|       cc_data_1 | 8 | bslbf |
|       cc_data_2 | 8 | bslbf |
|       '1' (marker bit) | 1 | bslbf |
|       } | | |
|     } | | |
|   } | | |
|   reserved | n | bslbf |
|   next_start_code() | | |
| } | | |
| where: | | |
|   user_data_type_code | is defined to be the constant '0x3'. | |
|   valid_flag | is a flag indicating when the closed captioning data is valid. | |
|   cc_type | is '01' for closed captioning data and '10' for XDS data. | |
|   next_start_code() | is the next MPEG compatible start code. | |

For purposes of identifying closed captioning data, syntax 2 is very similar to syntax 1. The differences are as follows. In syntax 1, one or more data groups follow the user_data_start_code, where each data group includes a user_data_length, a user_data_type and two closed captioning bytes. However, the user_data_length of each data group is always the constant 0x03 because the length of the one byte field user_data_type, which precedes each pair of closed captioning bytes, is added to the length of the closed captioning bytes. In syntax 2, data groups containing user_data_type's 0x09 and 0x0a can have either two or four closed captioning bytes. The first pair of bytes corresponds to the same picture (i.e., frame) containing the user data section in which the closed captioning bytes are found. The second pair of closed captioning bytes correspond to a subsequent picture which was contained in the original unencoded picture sequence but was omitted from the encoded video signal (e.g., because the subsequent frame was a repeat field, detected during an inverse telecine process of the encoding, or for some other reason).

Considering the different closed captioning methods employed, there is no guarantee that a decoder will be able to parse the closed captioning data. This makes it is difficult to manufacture interoperable encoding and decoding equipment. Furthermore, it is a non-trivial task to determine in real time which syntax has been used for encoding the closed captioning data at the time of decoding.

It is therefore an object of the present invention to overcome the disadvantages of the prior art.

SUMMARY OF THE INVENTION

This and other objects are achieved according to the present invention. According to one embodiment, a method is provided for parsing closed captioning (or extended data service) data encoded according to one of at least three syntaxes (e.g., four syntaxes). An encoded video signal is received which is hierarchically organized into picture sections of a picture layer. Each picture section contains an encoded picture and at least one corresponding user data section. A beginning of a sequence of bits of the user data section is identified within one of the picture sections. If the identified sequence of bits contains either undefined data or closed captioning data encoded according to either a specific first syntax or closed captioning data encoded according to a specific second syntax, but does not contain closed captioning data encoded according to any other syntax, then the following steps are performed. A byte is extracted from a beginning of the sequence representing a user data length. A byte is also extracted following the user data length byte in the sequence, which represents a user data type. A determination is made whether or not the user data length byte equals a first predefined constant or a second predefined constant, indicating the presence of two closed captioning bytes according to the first and second syntaxes, respectively. If so, then a determination is made as to whether or not the user data type byte equals a third predefined constant. If both these determinations are made in the affirmative, then immediately following the user data type byte in the sequence, two closed captioning bytes are extracted for the corresponding picture.

Illustratively, a determination can be made that closed captioning text, if present at all, must be formatted according to either the first or second syntax through process of elimination regarding the other permissible syntaxes. For example, prior to extracting the user data length byte, a determination can be made that the closed captioning data is encoded according to a specific third syntax if the first thirty-two bits of the sequence equals a fifth predefined constant. In addition, e.g., if this is untrue, a determination can be made that the subsequence contains closed captioning text encoded according to a specific fourth syntax if the first byte of the sequence of bits equals a sixth predefined constant and the next byte of the sequence of bits is different from both the first predefined constant and a seventh predefined constant.

The specific methodology according to the invention works because of certain discoveries regarding similarities and distinguishing features of the syntaxes, and regarding similar encoding habits of currently available encoders, which allows for a compact and simple deterministic parsing methodology.

DETAILED DESCRIPTION OF THE INVENTION

The invention is illustrated below in an application where closed captioning text is encoded (i.e., formatted) according to one of four syntaxes and is embedded in a user data section of a picture section of an MPEG-2 encoded video signal. However, the present invention is applicable to a signal encoded according to one of multiple incompatible syntaxes which is embedded in a video signal encoded according to another standard. In particular, except where it is explicitly or implicitly used to refer to only closed captioning data, the term "closed captioning data" should be construed to mean other similar types of data embedded in video signals in a like fashion, most notably, XDS data.

Figure 1:
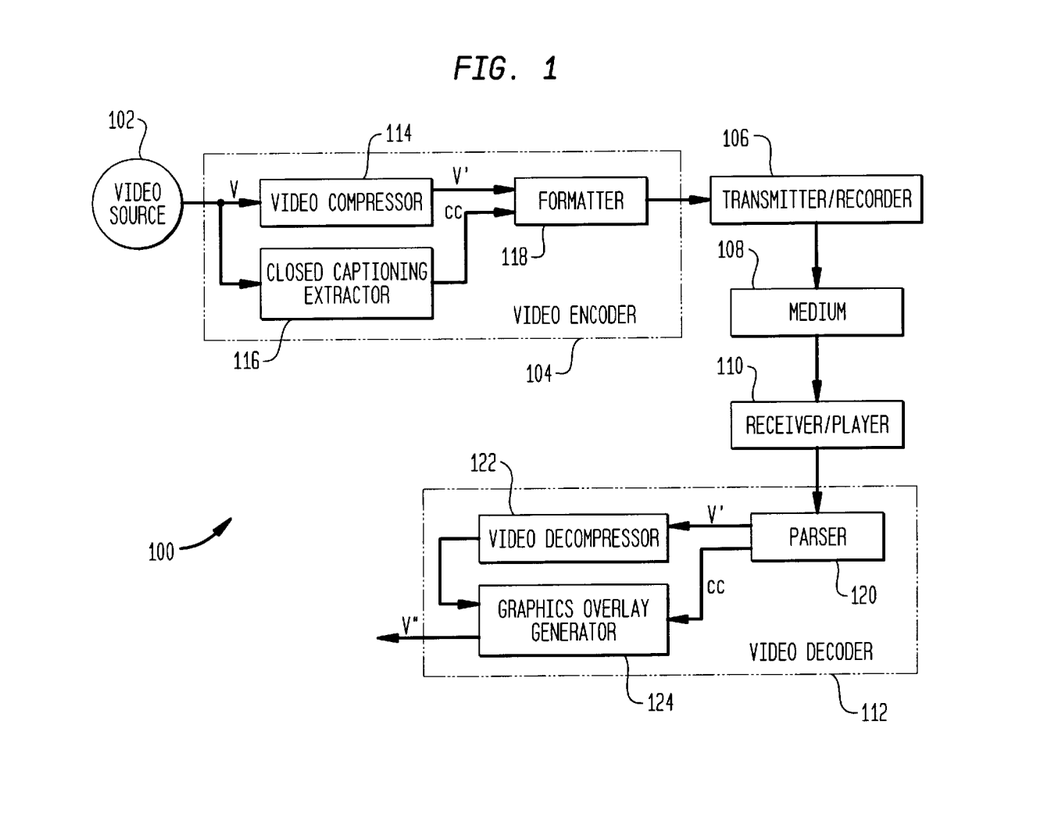
FIG. 1 shows a an encoding and decoding system according to an embodiment of the present invention.

FIG. 1 shows a system 100 according to an embodiment of the invention. The system 100 includes a video source 102, such as a video tape player/recorder, video camera, video editor, video magnetic or optical disk player/server, or the like. A video signal V outputted from the video source 102 is encoded by the video encoder 104. Illustratively, the video encoder 104 includes one or more suitably programmed DV Expert™ video encoder integrated circuits acting in concert, which are distributed by C-Cube Microsystems, Inc.™, a company located in Milpitas, Calif.. The video encoder 104 is shown as having three elements, namely, a video compressor 114, a closed captioning extractor 116 and a formatter 118. The video compressor 114 is for compressing the picture data of the video signal V (e.g., according to the MPEG-2 standard) to produce a compressed video signal V'. The closed captioning extractor 116 is for extracting closed captioning data, XDS data, emergency broadcast data, or the like (collectively referred to herein as closed captioning data CC). The formatter 118 is for forming an encoded video signal according to the MPEG-2 syntax. Illustratively, the formatter 118 inserts the closed captioning data CC associated with each picture into a user data section of the picture section that also contains the compressed picture data for that corresponding picture. If the corresponding picture is omitted, the closed captioning data CC may be placed into the user data section of a preceding picture which is encoded and inserted into the encoded video signal. Note that even if no closed captioning data CC is present, the formatter 118 is still needed to format the parameters, flags and data of the compressed video signal V' according to the syntax of the video encoding standard.

The encoded video signal is received by a transmitter or recorder 106, which may be a broadcast modulator, ATM SAR, magnetic or optical disk recorder, a video tape recorder or the like. The transmitter/recorder 106 transfers the encoded video signal to a storage/transmission medium 108 which can be the air, space, wires, optical fibers, a magnetic or optical disk, a magnetic tape or the like.

A receiver/player 110, which can be a tuner, a demodulator, an ATM SAR, a magnetic or optical disk player or the like receives or plays back the encoded video signal. The encoded video signal is fed to a video decoder 112 which decodes the video signal to produce a reconstructed video signal. The video decoder 112 may be implemented using one or more suitably programmed AViA™ video decoder integrated circuits, distributed by C-Cube Microsystems™, or one or more suitably programmed DV Expert™ video encoders. Depending on the resolution of the video signal, a single DV Expert™ video encoder may be used as both the video encoder 104 and the video decoder 112.

The video decoder 112 is shown as including three elements, namely, a parser 120, a video decompressor 122 and a graphics overlay generator 124. The parser 120 separates the compressed video signal V' and the closed captioning data CC. Note that a parser 120 is needed in a video decoder whether or not closed captioning data is present to parse the compressed video data, parameters and flags in the encoded video signal. The video decompressor 122 decompresses the compressed video signal V' outputted from the parser 120 to produce a reconstructed version of the video signal. In particular, if the video decompressor 122 detects a repeat_first_field_flag then a copy of a corresponding, previously decoded picture (e.g., the first presented field of the frame reconstructed from encoded picture data of a picture section which also contains the repeat_first_field flag) is inserted into the sequence of outputted displayed pictures. The graphics overlay generator 124 converts the closed captioning data to text and overlays the closed caption data on the reconstructed video signal to produce an outputted video signal V".In so doing, the graphics overlay generator 124 may overlay text generated from (a second pair of) data bytes extracted from the user data section of one picture section on the (above-noted) repeated copy of the picture decoded from that same picture section and inserted into the sequence of decoded, displayed pictures in response to the repeat_first_field flag. Illustratively, the overlaying of closed captioning data can be suppressed at the option of the user.

Figure 2:
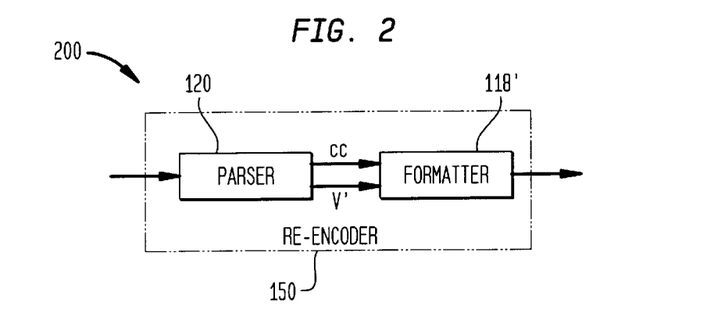
FIG. 2 shows a re-encoding system according to an embodiment of the present invention.

The system 100 is simply an illustrative system in which the invention may be applied. In another system 200 shown in FIG. 2, a re-encoder 150, such as a suitably programmed DV Expert™ video encoder receives an already encoded video signal. Such a re-encoder 150 has a parser 120 and a formatter 118'. The parser 120 of the re-encoder 150 simply separates the closed captioning CC data from the (user data section of the picture section of each encoded picture of the) encoded video signal V'. The closed captioning data CC may have been encoded according to one of multiple incompatible syntaxes. The closed captioning data CC is provided to the formatter 118' which encodes the closed captioning data only according to a single predetermined syntax. In so doing, an adjustment might need to be made to the number of bits of each picture, e.g., by adding or deleting stuffing data from each modified picture. As such, the re-encoder 150 receives a video signal with closed captioning data encoded according to any one of multiple syntaxes but outputs a video signal with closed captioning data encoded according to only a particular preselected syntax (which advantageously can be varied or changed). Such a reencoding system 200 may be useful in an application where it is known ahead of time that the decoder equipment 112 already deployed can only decode closed captioning data according to the single preselected syntax but not other syntaxes.

As mentioned above, closed captioning data may be encoded, i.e., formatted, according to one of multiple syntaxes. Illustratively, the parser 120 according to the invention can parse closed captioning data according to one of multiple incompatible syntaxes in a deterministic fashion. To understand why this is possible, consider the following heretofore undiscovered properties pertaining to the above-described (Tables 1–4), mutually incompatible closed captioning syntaxes:

(1) Syntaxes 1 and 2 have very similar formats but use distinctly different user_data_length values. Specifically, for closed captioning data, the only permissible user_data_length in syntax 1 is 0x03 and the only permissible user_data_length's in syntax 2 are 0x02 and 0x04;

(2) Syntaxes 1 and 2 use the same conventions for user_data_type identification of closed captioning data;

(3) When using syntaxes 1 and 2, all currently available program encoders insert the closed captioning data in the user data section in advance of any additional data contained therein;

(4) Syntax 3 has a unique ATSC_identifier which can be used to distinguish data formatted according to syntax 3 over syntaxes 1, 2 and 4; and (5) The user_data_type_code of syntax 4 could be confused with the user_data_length of syntax 1 (they are both 0x03); however, the byte following this user_data_type_code is always either 'f' or 'e' which cannot be confused with the user_data_type of syntax 1 as 'f' and 'e' are not permissible values for user_data_type in syntax 1.

Given these considerations, a parser can be constructed to evaluate the below noted syntax description of Table 5. The parser may be implemented using finite state automata. Preferably, however, the parser is implemented using a suitably programmed digital signal processor such as a AViA™ video decoder or a DV Expert™ video encoder.

TABLE 5

Omnibus CC Parsing Syntax

| Field name | # of Bits | Mnemonic |
| --- | --- | --- |
| picture_user_data() { | | |
|   user_data_start_code | 32 | bslbf |
|   if (nextbits() == '0x4741 3934') | | |
|     ATSC_identifier | 32 | bslbf |
|     user_data_type_code | 8 | uimsbf |
|     process_em_data_flag | 1 | bslbf |
|     process_cc_data_flag | 1 | bslbf |
|     additional_data_flag | 1 | bslbf |
|     cc_count | 5 | uimsbf |
|     em_data | 8 | bslbf |
|     for (i=0; i<cc_count; i++) { | | |
|       marker_bits='1111 1' | 5 | bslbf |
|       cc_valid | 1 | bslbf |
|       cc_type | 2 | bslbf |
|       cc_data_1 | 8 | bslbf |
|       cc_data_2 | 8 | bslbf |
|     } | | |
|     marker_bits='1111 1111' | 8 | bslbf |
|     if (additional_data_flag) { | | |

TABLE 5-continued

```
            while (nextbits() != '0000
              0000 0000 0000 0000 0001'){
                additional_user_data        8
              }
            }
          }
        }
      else if (nextbits()== 0x03){
        if (nextbits() != 0x030a &&
            nextbits() != 0x0309) {
              user_data_type_code          8              bslbf
              reserved                     7              bslbf
              cc_valid                     1              bslbf
              cc_count                     5              uimsbf
              for (i=0; i<cc_count; i++) {
                reserved                   2              bslbf
                cc_type                    2              bslbf
                reserved                   5              bslbf
                cc_data_1                  8              bslbf
                cc_data_2                  8              bslbf
                '1' (marker bit)           1              bslbf
              }
              while (nextbits() != '0000
                0000 0000 0000 0000 0001') {
                  reserved                 8              bslbf
              }
          }
        }
      else{
        user_data_length                   8              uimsbf
        user_data_type                     8              uimsbf
        syntax = unknown
        if (user_data_type == 0x09 ||
            user_data_type == 0x0a) {
              if (user_data_length == 0x03)
                syntax = 1
              else
                syntax = 2
        }
        if ((user_data_length == 0x02 ||
            user_data_length == 0x03) &&
            user_data_type == 0x09) {
              cc_data_1                    8              bslbf
              cc_data_2                    8              bslbf
        }
        else if (user_data_length == 0x04
            && user_data_type == 0x09) {
              cc_data_1 (first frame)      8              bslbf
              cc_data_2 (first frame)      8              bslbf
              cc_data_1 (second frame)     8              bslbf
              cc_data_2 (second frame)     8              bslbf
        }
        else if (user_data_type == 0x02 ||
            user_data_type == 0x03) {
              reserved                     8*5            bslbf
        } else {
          if (syntax == unknown)
            PROTOCOL ERROR
          if (syntax == 1)
            reserved                       8*(user_data_length-1)  bslbf
          if (syntax == 2)
            reserved                       8*user_data_length  bslbf
        }
        while(nextbits() != '0000 0000 0000
          0000 0000 0001') {
            reserved                       8              bslbf
        }
      }
    }
  }
where:
  ATSC_identifier      is 0x4741 3934 from the ATSC specification. All other
                       values are illegal.
  user_data_type_code  is 0x03 from the ATSC specification. All other values are
                       illegal.
  process_em_data_flag is ignored. Emergency broadcast messaging is not
                       supported via this syntax.
  process_cc_data_flag is ignored. If closed captioning data is non-zero, then
                       closed captioning data is processed.
  additional_data_flag is ignored. If extra data follows the closed captioning data
                       within the user data section, it is ignored.
```

TABLE 5-continued

| | |
|---|---|
| cc_count | specifies the number of closed captioning byte pairs that follow. |
| cc_valid | is ignored. |
| cc_type | is '01' for closed captioning data and '10' for XDS data. |
| cc_data_1, cc_data_2 | are two closed captioning bytes associated with a picture. For frame pictures that carry more than one pair, the first pair is assumed to correspond to the encoded picture also contained in the picture section in which these closed captioning bytes are found and the second pair is assumed to correspond to a subsequent, omitted picture. |
| marker_bits | are ignored. |
| additional_user_data | is ignored. |

The above syntax diagram can be implemented in a processor or finite state automata as follows. The function nextbits( ) can be implemented as a comparison of a certain number of bits, at the beginning of the sequence of bits in the user data(2) section of the picture section, with a specified value. Such a comparison can be achieved using an appropriate comparator logic circuit or arithmetic logic unit (e.g., of a processor executing suitable software or firmware). The number of bits compared in the function equals the number of bits of the value with which the comparison is made. Each assignment statement can be implemented by extracting a specified number of bits (specified by the mnemonic column), i.e., setting a corresponding variable equal to that value and advancing a pointer, which points to the beginning of the parsed sequence of bits in the user data section, by the same number of bits. This can be accomplished, for example, with a shift register (or barrel shifter) that selects a desired window of bits in the sequence of bits of the user data section of the picture section and a register or memory which stores the selected window of bits. If the extracted sequence of bits are ignored or not used, the extraction may simply comprise the step of advancing the pointer by, or shifting out, the requisite number of bits and discarding the shifted out bits or bits bypassed in advancing the pointer.

Figure 3A:
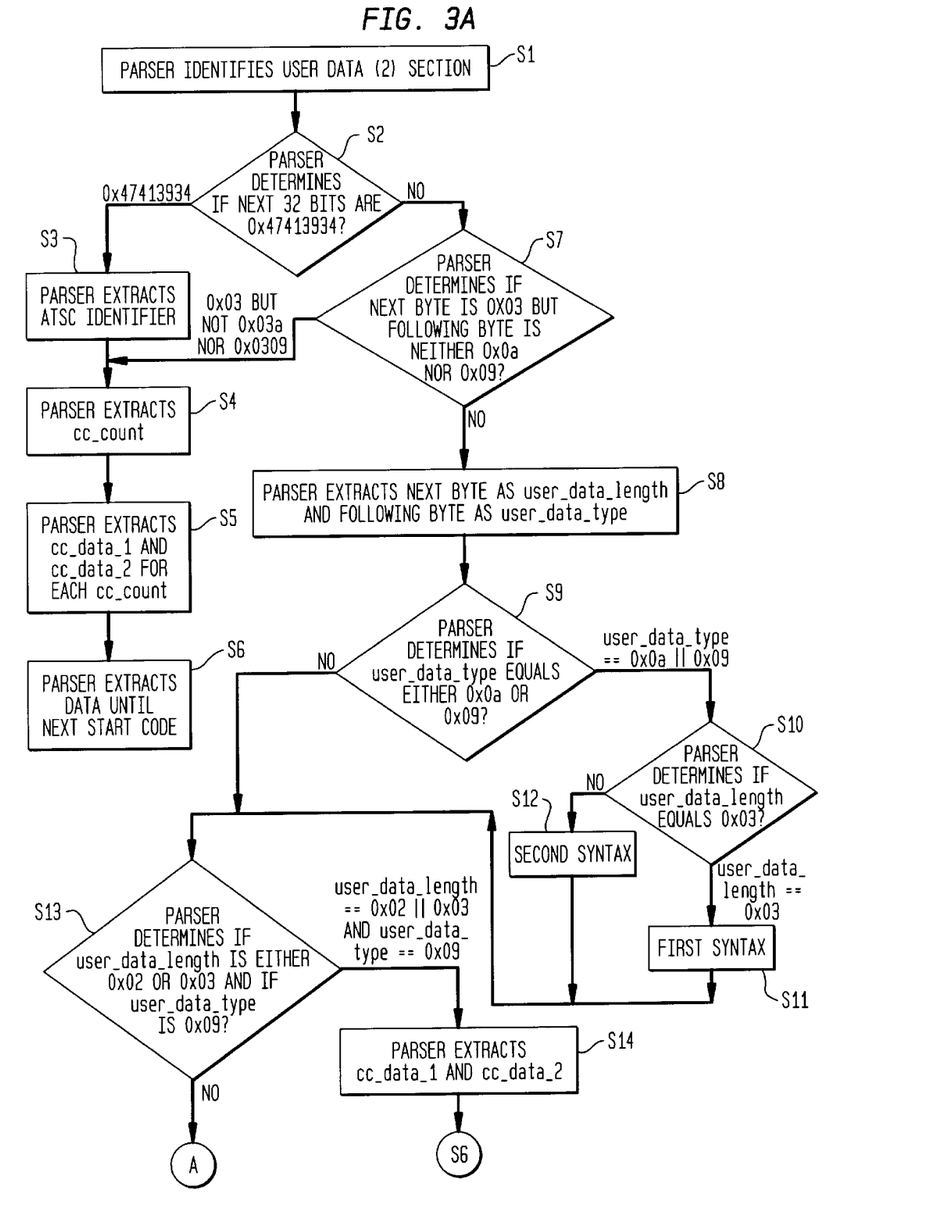
FIGS. 3A–3B shows the method steps used to parse the closed caption data according to an embodiment of the present invention.

The following is a brief description of an implementation of the syntax. First, the parser 120 identifies the user data (2) section (step S1) (referred to in the syntax as "picture_user_data( )"). This can be achieved as follows. The parser 120 scans the received sequence of bits for the unique section start code prefix '0000 0000 0000 0000 0000 0001' followed by the start code value 0x00 for a picture. Then while scanning the picture section that follows, the parser 120 encounters another unique start code prefix followed by the start code value 0xB2 for a user data section. When this occurs, the parser 120 extracts the user_data_start_code (the start code prefix and the start code value for the user data section) from the sequence. Next, the parser 120 determines whether the closed captioning data is encoded according to the above-noted third syntax (Table 3) by determining if the thirty-two bits at the beginning of the sequence (i.e., following the user_data_start_code) is the value 0x4741 3934 (step S2). If not, then the parser 120 determines that the user data section does not contain data according to the third syntax and the parser 120 continues to parse as per the first else statement, namely, the statement "else if (nextbits( )=0x03){".

If the next thirty-two bits are the constant 0x4741 3934, then the parser 120 extracts (and discards) these thirty-two bits as the ATSC identifier (step S3). Next, the parser 120 extracts a subsequence of five bits representing the cc_count which five bits are offset from the beginning of the sequence by eleven bits (corresponding to the extracted and discarded values user_data_type_code, process_em_data_flag (step S4), process_cc_data_flag and additional_data_flag). The parser 120 identifies the first closed caption data, namely, cc_data_1, offset from the cc_count by sixteen bits (corresponding to the extracted and discarded em_data byte, the first set of eight marker_bits, and the first cc_valid bit and the extracted first cc_type pair of bits). Next, for each iteration indicated by cc_count, the parser 120 extracts two closed captioning bytes, namely, cc_data_1 and cc_data_2 (step S5). Note that the second pair of closed captioning data bytes is offset from the first pair of closed captioning data bytes by an offset of eight bits (corresponding to the extracted next occurrence of the marker bits, cc_valid bit and cc_type bits, the marker and cc_valid bits being discarded). Then, the parser 120 may extract (and discard) another eight marker bits as well as each additional_user_data byte until the next MPEG-2 start code (i.e., 0000 0000 0000 0000 0000 0001) (step S6).

Assume now that the first thirty-two bits did not match the ATSC_identifier constant. The parser 120 determines if the closed captioning data complies with the above-noted fourth syntax (Table 4) by determining if the next byte at the beginning of the sequence matches the value 0x03, but that the second byte does not match either the constant 0x0a or the constant 0x09 (step S7). Note that the patterns 0x030a and 0x0309 are two-byte patterns which may be found at the beginning of closed caption data encoded according to the first syntax (table 1). However, such two-byte patterns never occur at the beginning of closed captioning data encoded according to the third syntax because the value 0x03 is always followed by the value '0x ff' or '0fe' (by virtue of the seven reserved bits followed by the cc_valid bit). If the next byte is 0x03 but the byte which follows the next byte is not 0x0a or 0x09 then the parser 120 extracts and discards the user_data_type_code byte and extracts a five bit sequence representing the cc_count offset from the beginning of the user_data_type_code by eight bits (corresponding to the extracted and discarded reserved bits and cc_valid bit (step S4)). The parser 120 identifies the first closed captioning byte cc_data_1 at an offset of nine bits from the cc_count (corresponding to the extracted and discarded two reserved bits, the extracted two cc_type bits and the extracted and discarded following five reserved bits). For each count of cc_count, the parser extracts two closed captioning bytes, namely, cc_data_1 and cc_data_2 (step S5). Note that a successive pair of closed captioning bytes are separated from a previous pair of closed captioning bytes by an offset of ten bits (namely, the extracted and discarded marker bit, the extracted and discarded next two reserved bits, the extracted next two cc_type bits and the extracted and discarded next five reserved bits). Afterward, the parser 120 extracts and discards each reserved byte until the next MPEG-2 start code (step S6).

Figure 3B:
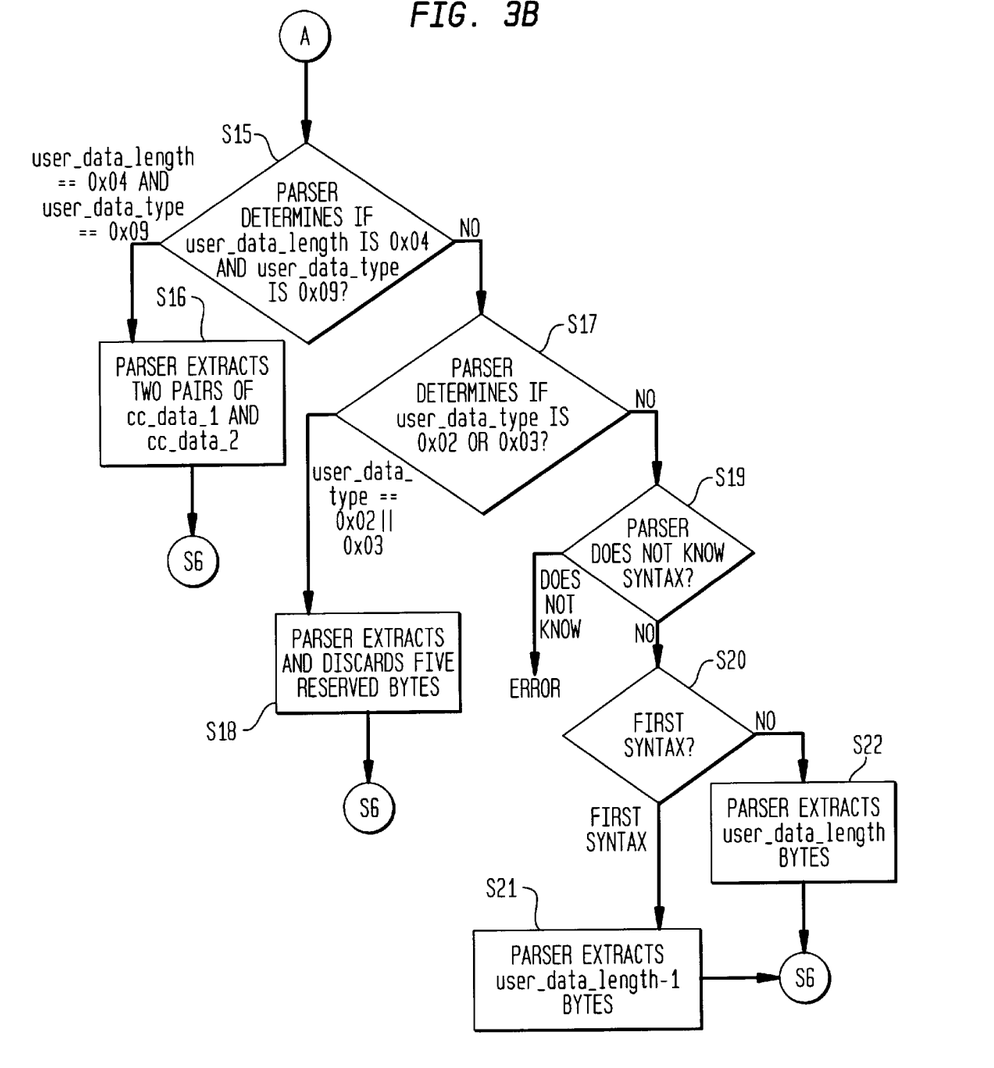

If the closed captioning data is not encoded according to any of the other syntaxes previously described, then the parser 120 presumes that closed captioning data is encoded according to either the first syntax (table 1) or the second syntax (table 2) (if encoded according to any predefined syntax). Thus, the parser 120 extracts the next byte at the beginning of the sequence as the user_data_length and the parser 120 extracts the following byte as the user_data_type (step S8). The parser 120 then compares the user_data_type to the constants 0x0a and 0x09 (step S9). If the parser 120 detects that the user_data_type is equal to the constant 009 or the constant 0x0a then the parser 120 can determine, with certainty, which of the first and second syntaxes were used for formatting the closed captioning data. Specifically, the parser 120 can determine that the closed captioning data is encoded according to the first syntax (step S11) if the user_data_length is the constant 0x03 (step S10) and according the second syntax otherwise (step S12).

The parser 120 then determines if the user_data_length is the same as the constant 0x02 or the constant 0x03. If the parser 120 detects that the user_data_length is 0x02 or 0x03, then the parser 120 determines if the user_data_type is the same as 0x09 (step S13). If both comparisons result in a match, the parser 120 extracts a pair of closed captioning bytes cc_data_1 and cc_data_2 (step S14).

If a match cannot be found in either determination, the parser 120 determines if the user_data_length is the same as the constant 0x04 and if user_data_type is the same as the constant 0x09 (step S15). If so, then the parser 120 extracts two pairs of closed captioning data bytes, namely, cc_data_1 and cc_data_2 for this frame and cc_data_1 and cc_data_2 for the next frame (step S16). In this case, the "next frame" is an omitted picture, such as a repeat field.

On the other hand, if the user_data_length does not match 0x04 or the user_data_type does not match 0x09, the parser 120 determines if the user_data_type is the same as the constant 0x02 or the constant 0x03 (step S17). If so, then the parser 120 extracts five reserved bytes and discards them (step S18).

If not, then if the syntax is unknown the parser 120 signals an error (step S19). Otherwise, if the parser 120 had determined that the closed captioning data is encoded according to the first syntax but a combination of user_data_type and user_data_length other than those set forth above occurs (step S20), then the parser 120 simply extracts and discards the respective number of bytes indicated by the user_data_length less one (step S21). If the syntax was determined to be the second syntax, but a combination of user_data_type and user_data_length other than those set forth above occurs, the parser 120 simply extracts and discards a number of bytes indicated by user_data_length (step S22). Finally, the parser 120 extracts and discards each byte afterward until the next MPEG-2 start code (step S6).

The above discussion is merely illustrative of the invention. Those skilled in the art may devise numerous alternative embodiments without departing from the spirit and scope of the invention.

What is claimed is:

1. A method for parsing closed captioning data encoded according to one of at least three syntaxes, comprising the steps of:
   (a) receiving an encoded video signal which is hierarchically organized into picture sections of a picture layer, each picture section containing an encoded picture and at least one corresponding user data section,
   (b) identifying a beginning of a sequence of bits of said user data section within one of said picture sections,
   (c) if said identified sequence of bits contains either undefined data or closed captioning data encoded according to either a specific first syntax or closed captioning data encoded according to a specific second syntax, but not closed captioning data encoded according to any of said other syntaxes, then:
      (1) extracting a byte from a beginning of said sequence representing a user data length, and a byte following said user data length byte in said sequence, representing a user data type, and
      (2) if said user data length byte equals a first predefined constant or a second predefined constant, different from the first predefined constant, which first and second constants indicate the presence of two closed captioning bytes according to said first and second syntaxes, respectively, and said user data type byte equals a third predefined constant, then immediately following said user data type byte in said sequence, extracting exactly two closed captioning bytes for said corresponding picture.

2. The method of claim 1 further comprising the step of:
   (d) if said user data type byte equals said first constant but said user data length byte equals a fourth predefined constant, which fourth constant indicates four closed captioning bytes according to said first syntax, then extracting four bytes from said sequence following said second extracted byte, including two closed captioning bytes, for said corresponding encoded picture, followed by two closed captioning bytes for a picture omitted from said encoded video signal but generated and presented during decoding.

3. The method of claim 1 further comprising the steps of:
   (d) prior to step (c), determining that said closed captioning data is encoded according to a specific third syntax if the first thirty-two bits of said sequence equals a fifth predefined constant.

4. The method of claim 3 further comprising the steps of:
   (e) if said data sequence is determined to contain closed captioning data encoded according to said specific third syntax, then:
      (1) extracting said first thirty-two bits at the beginning of said sequence,
      (2) extracting a first predetermined, fixed length iteration counter subsequence of bits offset from said beginning of said sequence by a first predefined, fixed offset,
      (3) identifying a beginning of closed captioning data in said sequence at a second predetermined fixed offset from said extracted iteration counter subsequence of bits,
      (4) for each iteration indicated in said iteration counter subsequence of bits, extracting a pair of closed captioning data bytes from said sequence of bits, each successive pair of closed captioning data bytes being offset from a previous pair of closed captioning data bytes by a third predetermined fixed length offset.

5. The method of claim 3 further comprising the steps of:
   (e) if said data sequence is not determined to contain closed captioning data encoded according to said specific third syntax, then prior to step (c), determining that said sequence contains closed captioning text encoded according to a specific fourth syntax if the first byte of said sequence of bits equals a sixth predefined constant and the next byte of said sequence of bits is different from both said first predefined constant and a seventh predefined constant.

6. The method of claim 5 further comprising the steps of:
   (f) if said sequence is determined to contain closed captioning data encoded according to said fourth syntax, then:

(1) extracting said first and second bytes from the beginning of said sequence, (2) extracting a second predetermined, fixed length iteration counter subsequence of bits, and (3) for each iteration indicated in said iteration counter subsequence of bits, extracting a pair of closed captioning data bytes from said sequence of bits, each successive pair of closed captioning data bytes being offset from a previous pair of closed captioning data bytes by a fourth predetermined fixed length offset.

7. The method of claim 5 further comprising the step of:

(g) if said sequence is not determined to contain closed captioning data encoded according to said fourth syntax, then performing step (c).

8. The method of claim 1 further comprising the steps of:

(e) prior to step (c), determining that said sequence of bits contains closed captioning text encoded according to a specific third syntax if a first byte aligned with the beginning of said sequence equals a fourth predefined constant and a second byte immediately following said first byte in said sequence is different from said first predefined constant and a fifth predefined constant.

9. The method of claim 8 further comprising the steps of:

(i) if said sequence is determined to contain closed captioning data encoded according to said third syntax, then:

(1) extracting said first and second bytes, (2) extracting a predetermined, fixed length iteration counter subsequence of bits, and (3) for each iteration indicated in said iteration counter subsequence of bits, extracting a pair of closed captioning data bytes from said sequence of bits, each successive pair of closed captioning data bytes being offset from a previous pair of closed captioning data bytes by a first predefined fixed length offset.

10. The method of claim 1 further comprising the step of generating closed captioning text from said extracted closed captioning bytes and displaying a decoded picture, with closed captioning text generated from said closed captioning data bytes overlaid thereon, on a monitor.

11. The method of claim 1 further comprising the step of if said extracted closed captioning text is encoded according to a syntax other than a predefined syntax then re-encoding said extracted closed captioning data according to said preselected syntax and embedding said re-encoded closed captioning data in said picture section of said encoded video signal.

12. An apparatus for parsing closed captioning data encoded according to one of at least three syntaxes, comprising:

a parser input for receiving an encoded video signal which is hierarchically organized into picture sections of a picture layer, each picture section containing an encoded picture and at least one corresponding user data section, and a parser for identifying a beginning of a sequence of bits of said user data section within one of said picture sections, for determining if said identified sequence of bits contains either undefined data or closed captioning data encoded according to either a specific first syntax or closed captioning data encoded according to a specific second syntax, but not closed captioning data encoded according to any of said other syntaxes, and, if said determination is affirmative, for:

(1) extracting a byte from a beginning of said sequence representing a user data length, and a byte following said user data length byte in said sequence, representing a user data type, and (2) if said user data length byte equals a first predefined constant or a second predefined constant, different from the first predefined constant, which first and second constants indicate the presence of two closed captioning bytes according to said first and second syntaxes, respectively, and said user data type byte equals a third predefined constant, then immediately following said user data type byte in said sequence, extracting exactly two closed captioning bytes for said corresponding picture.

13. The apparatus of claim 12 further comprising:

a graphics overlay generator responsive to said closed captioning data bytes for generating closed captioning text from said extracted closed captioning bytes and displaying a decoded picture, with closed captioning text generated from said closed captioning data bytes overlaid thereon, on a monitor.

14. The apparatus of claim 12 further comprising:

a formatter for, if said extracted closed captioning text is encoded according to a syntax other than a predefined syntax then re-encoding said extracted closed captioning data according to said preselected syntax and embedding said re-encoded closed captioning data in said picture section of said encoded video signal.

15. The apparatus of claim 13 further comprising:

a video decompressor, for decompressing said encoded pictures of said video signal, said video decompressor responding to a flag indicating that a picture should be repeated by inserting an extra copy of a picture decompressed from a picture section containing said flag into a sequence of decompressed pictures, said graphics overlay generator overlaying an extra pair of closed captioning bytes, extracted from said same picture section as said flag, on said inserted extra copy of said decompressed picture.

* * * * *